No. 855,700.  
PATENTED JUNE 4, 1907.  
F. W. FRENCH.  
NUT LOCK.  
APPLICATION FILED MAR. 29, 1906.
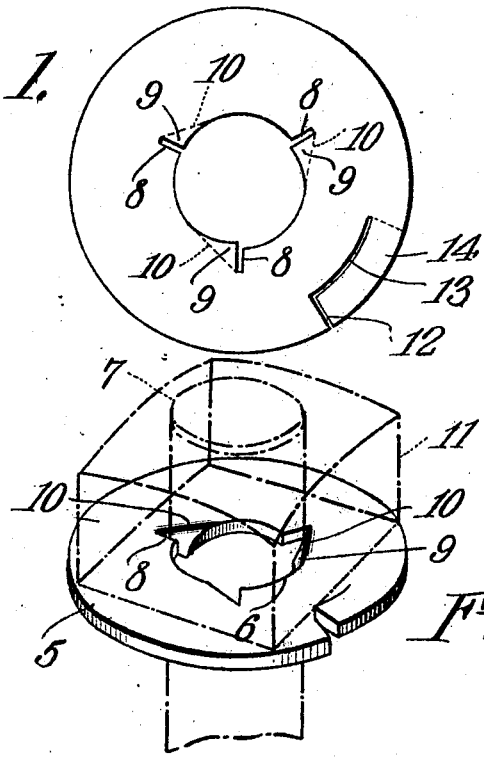
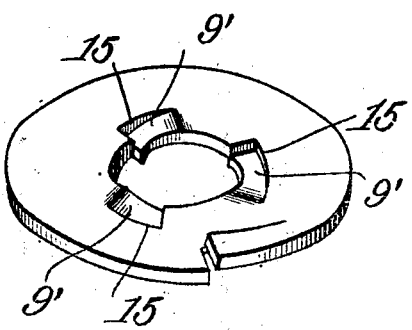
Frederick W. French,  
INVENTOR.
WITNESSES:
By C. A. Snow & Co.  
ATTORNEYS

UNITED STATES PATENT OFFICE.

FREDERICK WM. FRENCH, OF OAKLAND, CALIFORNIA.

NUT-LOCK.

No. 855,700.      Specification of Letters Patent.      Patented June 4, 1907.

Application filed March 29, 1906. Serial No. 308,756.

*To all whom it may concern:*

Be it known that I, FREDERICK WM. FRENCH, a citizen of the United States, residing at Oakland, in the county of Alameda and State of California, have invented a new and useful Nut-Lock, of which the following is a specification.

This invention relates to nut locks and has for its object to provide a simple, inexpensive and efficient device of the class described for locking nuts upon bolts so as to prevent accidental displacement of the same.

A further object of the invention is to provide a washer having a plurality of spring-locking teeth or lips the terminals of which project beyond the interior walls of the bolt receiving opening for engagement with the threads on the bolt when the nut is adjusted on the latter.

A further object is to form the washer with an integral spring locking tongue adapted to engage the walls of the nut and lock the same against rotation.

A still further object of the invention is to generally improve this class of devices so as to increase their utility and durability as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings forming a part of this specification: Figure 1 is a top plan view of a washer constructed in accordance with my invention. Fig. 2 is a perspective view of the washer showing the same in position on a bolt. Fig. 3 is a perspective view illustrating a modified form of the invention.

Similar numerals of reference indicate corresponding parts in all of the figures of the drawings.

The improved nut lock consists of a disk or washer 5 preferably circular in shape, as shown, and stamped from a single piece of metal or other suitable material, said washer being provided with a centrally disposed opening 6 for the reception of the bolt 7. The washer 5 is formed with a plurality of radial slits or cuts 8 spaced an equal distance apart and defining a series of spring-locking teeth or lips 9 the terminals or points of which project inwardly beyond the adjacent walls of the bolt receiving opening for engagement with the threads on the bolt 7. The teeth or lips 9 are bent or deflected downwardly on lines 10 preferably disposed tangentially to the walls of the opening 6, as best shown in Figs. 1 and 2 of the drawings, so that when the washer is positioned on the fish-plate of a rail joint or other non-yieldable support and the nut 11 adjusted on the bolt 7 the teeth 9 will have a tendency to straighten or assume the position shown in Fig. 1, thereby causing the teeth to bite into the threads on the bolt and lock the parts together.

When the washer is used on a wooden support, such as the cross-beams of a bridge structure, the teeth will be embedded in the wood or other material and thereby prevent rotation of the washer. The marginal edge of the washer is formed with an inwardly extending cut or slot 12 which communicates with a segmental slot 13 defining a spring-locking tongue 14 the free end of which is bent upwardly beyond the upper surface of the washer for engagement with the walls of the nut 11. It will thus be seen that the nut is free to rotate in one direction but is effectually locked against rotation in the opposite direction.

In Fig. 3 of the drawings there is illustrated a modified form of the invention in which the locking teeth or lips 9' are formed by slitting the metal as indicated at 15

From the foregoing description it will be seen that there is provided an extremely simple and efficient device capable of being used on rail-joints, wagons, bridge-structures and wherever a device of this character is found desirable.

Having thus described the invention what is claimed is:—

1. A nut lock comprising a washer having a bolt-receiving opening and provided with a series of radial slits spaced an equal distance apart and defining a plurality of spring locking teeth the free ends of which normally project inwardly beyond the walls of the bolt-receiving opening with their terminals bent downwardly below the lower face of the washer on lines disposed tangentially to the walls of said bolt-receiving opening, and a single integral spring locking tongue struck up from the opposite face of the washer and adapted to engage the walls of the nut for locking the latter against rotation.

2. As a new article of manufacture, a nut lock comprising a washer having a bolt-receiving opening and provided with a series of radial slits communicating with said opening and spaced an equal distance apart to form a plurality of locking teeth the free ends of which normally project inwardly beyond the walls of the bolt-receiving opening with their terminals bent downwardly at an angle to the lower face of the washer on lines connecting the ends of the radial slits with the walls of the bolt-receiving opening, and a single integral spring locking tongue struck up from the upper face of the washer and adapted to engage the walls of the nut for locking the latter against rotation.

In testimony that I claim the foregoing as my own, I have hereto affixed my signature in the presence of two witnesses.

FREDERICK WM. FRENCH.

Witnesses:
  META BULL,
  GEO. S. MONTGOMERY.